United States Patent [19]

Yamaguchi

[11] Patent Number: 5,227,872
[45] Date of Patent: Jul. 13, 1993

[54] CHROMATIC IMAGE RECORDING APPARATUS PROVIDED WITH A COLOR CORRECTIVE FUNCTION

[75] Inventor: Toshiyuki Yamaguchi, Toyoake, Japan

[73] Assignee: Brother Kogyo Kabushiki Kaisha, Nagoya, Japan

[21] Appl. No.: 722,200

[22] Filed: Jun. 27, 1991

[30] Foreign Application Priority Data

Jun. 27, 1990 [JP] Japan ................................. 2-169428

[51] Int. Cl.$^5$ .............................................. H04N 1/46
[52] U.S. Cl. ....................................... 358/79; 358/80; 358/75; 358/401
[58] Field of Search ........................ 358/75, 79, 80, 81, 358/428, 400, 401, 296, 298

[56] References Cited

U.S. PATENT DOCUMENTS

| 4,642,681 | 2/1987 | Ikeda | 358/79 |
| 4,682,216 | 7/1987 | Sasaki | 358/79 |
| 4,992,860 | 2/1991 | Hamaguchi et al. | 358/428 |
| 5,191,409 | 3/1993 | Hamaguchi et al. | 358/75 |

FOREIGN PATENT DOCUMENTS

| 59-204379A | 11/1984 | Japan | 358/79 |
| 60-249469A | 12/1985 | Japan | 358/79 |

Primary Examiner—Edward L. Coles, Sr.
Assistant Examiner—Jerome Grant, II
Attorney, Agent, or Firm—Oliff & Berridge

[57] ABSTRACT

An image processing device in an image forming apparatus processes signals related to color data obtained from an original to generate appropriate printer control signals. The device determines whether less than a maximum number of available printer control signals can provide accurate characterization of the original color data. If less than a maximum number of available printer control signals cannot provide accurate characterization of the original color data, the maximum number of available printer control signals are generated.

12 Claims, 7 Drawing Sheets

CHROMATIC IMAGE RECORDING APPARATUS PROVIDED WITH A COLOR CORRECTIVE FUNCTION

BACKGROUND OF THE INVENTION

The present invention relates to the color correction for use in recording a chromatic image, and more particularly to a chromatic image recording apparatus provided with a color corrective function appropriate for reproducing colors using a four-color recording system.

Such a chromatic image recording apparatus provided with the color corrective function is known in the art and, for exemplary purposes, one is now described. In the chromatic image recording apparatus, a digital concentration signal is entered. A printer control signal is determined from the digital concentration signal, and a chromatic image is recorded according to the printer control signal. The digital concentration signal corresponds to the concentration or the reflectance of each decomposed color per pixel composing the chromatic image, quantized in multiple value levels. In the chromatic image recording apparatus, a storing member stores the relationship between multiple input record color signals and outputs cyan, magenta and yellow printer control signals. From the printer control signals stored in the storing member, a selecting member selects multiple printer control signals according to the input record color signals. The number of the input record color signals corresponds to that of the decomposed colors per pixel composing the chromatic image. From the multiple printer control signals selected by the selecting member, an interpolating member obtains printer control signals corresponding to the input record color signals. According to the printer control signals obtained by the interpolating member, the chromatic image is recorded using cyan (C), magenta (M) and yellow (Y) ink or toner. The interpolation is performed using the following equation:

$$Di = \left\{ \sum_{j=0}^{7} (Mj \cdot Lij) \right\} / \sum_{j=0}^{7} Mj \tag{1}$$

In the equation (1), Lij (i=C,M,Y) denotes a printer control signal corresponding to the vertex of a stored block. Mj denotes the volume of the rectangular parallelepiped, which is composed of the diagonal vertices of the vertex as well as the vertex corresponding to the input color signal of the desired pixel. Di denotes a printer control signal of the interpolated desired pixel.

As compared with the above-mentioned three-color record system consisting of cyan, magenta and yellow, a four-color record system consisting of cyan, magenta, yellow and black has a wider color reproducible region at high concentration, has better reproducibility of gray tints, and requires less ink or toner. When the above mentioned apparatus is provided with the four-color record system, however, the interpolating member obtains only discontinued printer control signals. For explanatory purposes, assumed values are used in this paragraph. When the three colors consisting of cyan, magenta and yellow are interpolated, on the assumption that red is represented by the value of $(C,M,Y)=(0,20,10)$ and black is represented by the value of $(C,M,Y)=(10,10,10)$, dark red is then represented by:

$$(C,M,Y) = \{(0+10)/2, (20+10)/2, (10+10)/2\} = (5,15,10)$$

Substantially, the dark red is represented by $$(C,M,Y) = \{(kC_1+C_2)/n, (kM_1+M_2)/n, (kY_1+Y_2)/n\}$$

The first equation is obtained from the latter on the assumption of $k=1$ and $n=2$. On the other hand, when the four colors consisting of the above three colors plus black are interpolated, red is represented by $(C,M,Y,K)=(0,20,10,0)$, in which K denotes black. Black is assumed to be represented by $(C,M,Y,K)=(10,10,10,0)$ or $(C,M,Y,K)=(0,0,0,20)$. Accordingly, the data of black is not limited to one data set. The dark red is then represented by:

$$(C,M,Y,K) = \{(0+10)/2, (10+20)/2, (10+10)/2, (0+0)/2\} = (5,15,10,0),$$

which is continuous data. However, the dark red may also be represented by the following discontinuous data:

$$(C,M,Y,K) = \{(0+0)/2, (20+0)/2, (10+0)/2, (0+20)/2\} = (0,10,5,10)$$

Such discontinuous data may represent not colors changing by degrees from red to black, but completely different colors. Consequently, such insufficient printer control signals result in insufficient color reproducibility.

SUMMARY OF THE INVENTION

The object of the invention is thus to provide a chromatic image recording apparatus provided with an image processing device that sufficiently reproduces in a four-color recording system.

The above and other related objects are realized by a chromatic image recording apparatus. The apparatus comprises a recording member for recording a chromatic image using cyan, magenta and yellow ink or toner according to a plurality of printer control signals. A generating apparatus processes color data signals from an original to generate appropriate printer control signals indicative of print concentration levels. The apparatus determines whether cyan, magenta and yellow printer control signals can accurately characterize the original color data. If not, cyan, magenta, yellow and black printer control signals are generated. These control signals are used to control the recording member. A color corrective member receives a digital concentration signal corresponding to the concentration or the reflectance obtained by quantizing each decomposed color per pixel composing the chromatic image in multiple value levels. The relationship between the multiple record colors and the printer control signal transmitted from the recording member is stored. A selecting member selects multiple printer control signals from the printer control signals stored in the storing member, based on the digital concentration signal. An interpolating member obtains cyan, magenta and yellow printer control signals corresponding to the digital concentration signal, from the multiple printer control signals selected by the selecting member. The chromatic image recording apparatus records the chromatic image according to the cyan, magenta and yellow printer control signals obtained by the interpolating member. The chromatic image recording apparatus comprises a black printer control signal determining member for sending out black ink or toner printer control signal according to the cyan, magenta and yellow printer control signals obtained by the interpolating member. The black printer control signal determining member generates the black printer control signal, when the cyan, magenta and yellow printer control signals indicate concentrations having or exceeding specified levels.

The black printer control signal determining member comprises a subtracting member. The subtracting member subtracts from the cyan, magenta and yellow printer control signals, the fixed amount corresponding to the black printer control signal, in the direction in which the concentration of the chromatic image decreases.

In the chromatic image recording apparatus, the digital concentration signal is entered, corresponding to the concentration or the reflectance obtained by quantizing each decomposed color per pixel composing the chromatic image in multiple value levels. Based on the signals of the decomposed colors, multiple cyan, magenta and yellow printer control signals are selected from the stored printer control signals. Subsequently, the selected printer control signals are interpolated to obtain the cyan, magenta and yellow printer control signals corresponding to the input color signals. When the obtained cyan, magenta and yellow printer control signals have the concentration having or exceeding the specified level, the black ink or toner printer control signal is obtained. According to the cyan, magenta, yellow and black printer control signals, the chromatic image is recorded using four-color ink or toner.

When the black printer control signal determining member is provided with the subtracting member, after the fixed amount, which corresponds to the black printer control signal, is subtracted from the cyan, magenta and yellow printer control signals in the direction in which the concentration of the chromatic image decreases, the chromatic image is recorded.

DETAILED DESCRIPTION OF PREFERRED EMBODIMENT

An embodiment of a chromatic image recording apparatus according to the invention is now described with reference to the drawings.

Figure 1:
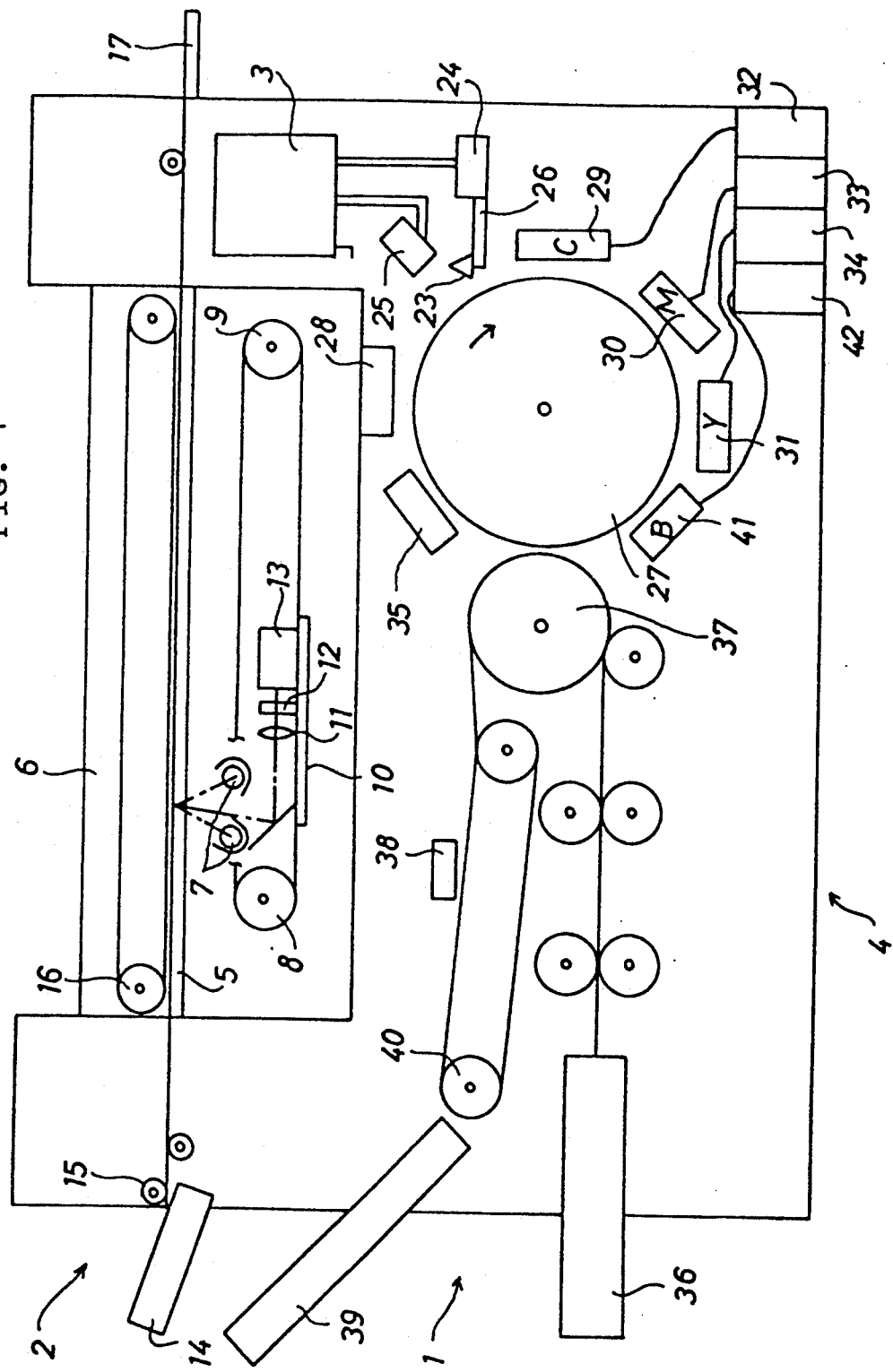
FIG. 1 is a structural view of a copying machine for an embodiment according to the invention.

As shown in FIG. 1, a digital color copying machine 1 comprises an original reading portion 2, a chromatic image processing portion 3 and a chromatic image recording portion 4.

The original reading portion 2 comprises a transparent base 5 and a cover 6. A not-shown color original is placed facing down on the transparent base 5, and the cover 6 presses down the color original. Fluorescent lamps 7, for sending scanning light rays onto the color original, are placed along a main scanning direction, traversing below the transparent base 5. The original reading portion 2 comprises a movable reflecting mirror 8 for reflecting the light rays reflected by the color original. The fluorescent lamps 7 and the movable reflecting mirror 8 are moved in the auxiliary scanning direction, from the left to the right as the figure is viewed, by a light-source moving device 9. The light rays reflected by the movable reflecting mirror 8 are again reflected by a fixed reflecting mirror 10. The original reading portion 2 also comprises a lens 11 for converging the light rays reflected by the movable and fixed reflecting mirrors 8 and 10, a filter 12 for decomposing the light rays converged by the lens 11 into red, green and blue components, and a charge coupled device 13 (referred to as CCD hereinafter) for taking in the decomposed light rays and converting light signals to analog electric signals. On the other hand, an original feeder 14 is at the left of the original reading portion 2 as the figure is viewed. Feed rollers 16 are formed integrally in the cover 6, for automatically transferring the color original from the original feeder 14 through an original inlet 15 onto the transparent base 5. After photocopying, the color original is discharged onto an original tray 17.

Figure 2:
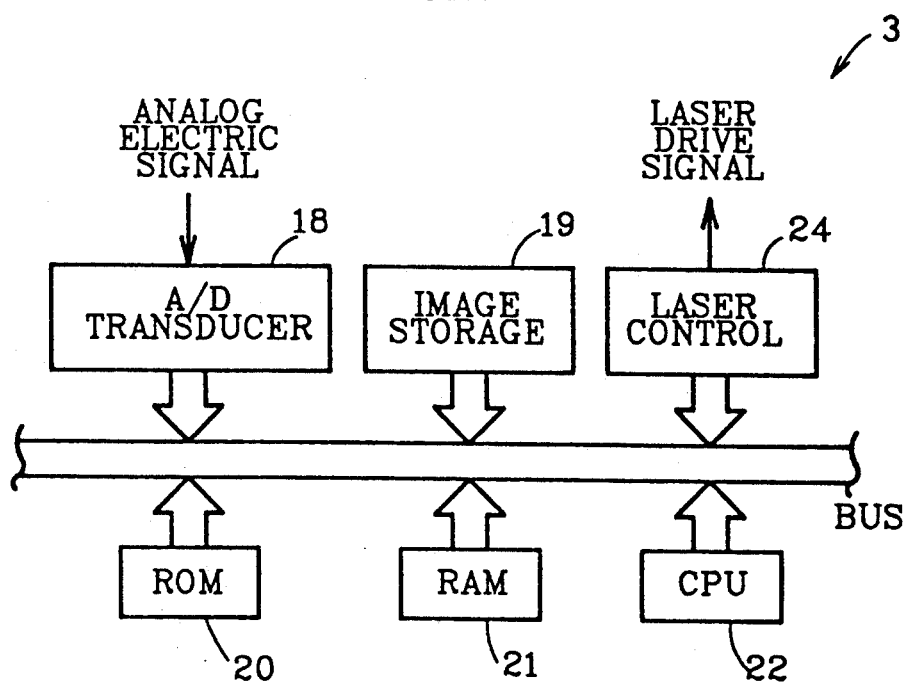
FIG. 2 is a block diagram of a chromatic image processing portion in the chromatic image recording apparatus.

The chromatic image processing portion 3, as shown in FIG. 2, comprises an A/D transducer 18 for receiving the analog electric signals of the color original data from the CCD 13 and converting the analog electric signals into digital electric signals. The digital electric signals are transmitted to an image storage 19 for storing a part or the whole of the color original data. The chromatic image processing portion 3 also comprises a ROM 20, a RAM 21, a CPU 22 and a laser control 24. In the ROM 20 the printer control signals and various image processing methods for various record colors are stored. The RAM 21 stores computation results. The CPU 22 processes various images using the computation results. Based on the printer control signals transmitted after the color corrective process, the laser control 24 transmits a drive signal to a laser 23 in the chromatic image recording portion 4. In the chromatic image processing portion 3, the A/D transducer 18, the image storage 19, the ROM 20, the RAM 21, the CPU 22 and the laser control 24 are connected via a bus line.

In the chromatic image recording portion 4, according to the drive signal transmitted from the laser control 24, the laser 23 irradiates a laser beam from a laser modulating unit 26 to a polygonal mirror 25. The chromatic image recording portion 4 also comprises a photosensitive drum 27 for reacting to the laser beam reflected by the polygonal mirror 25. The photosensitive drum 27 is uniformly charged with negative electricity by an electrostatic charge unit 28. By irradiating the laser beam onto the photosensitive drum 27 charged by the electrostatic charge unit 28, a latent image is formed on the photosensitive drum 27. A cyan developing unit 29, a magenta developing unit 30, a yellow developing unit 31 and a black developing unit 41 apply cyan, magenta, yellow and black toner, respectively, to the latent image formed on the photosensitive drum 27. A cyan toner supply unit 32, a magenta toner supply unit 33, a yellow toner supply unit 34 and a black toner supply unit 42 supply toner to the cyan, magenta, yellow and black developing units 29, 30, 31, 41, respectively. The chromatic image recording portion 4 also comprises a cleaner 35 for removing remaining toner from the photosensitive drum 27. Toner is transferred from the photosensitive drum 27 onto a not-shown record sheet supplied from a paper cassette 36. The color development on the record sheet with the toner transferred thereon is promoted by a thermal fixing unit 38, and the record sheet is discharged by a paper feed unit 40 onto a paper tray 39.

Figure 5A:
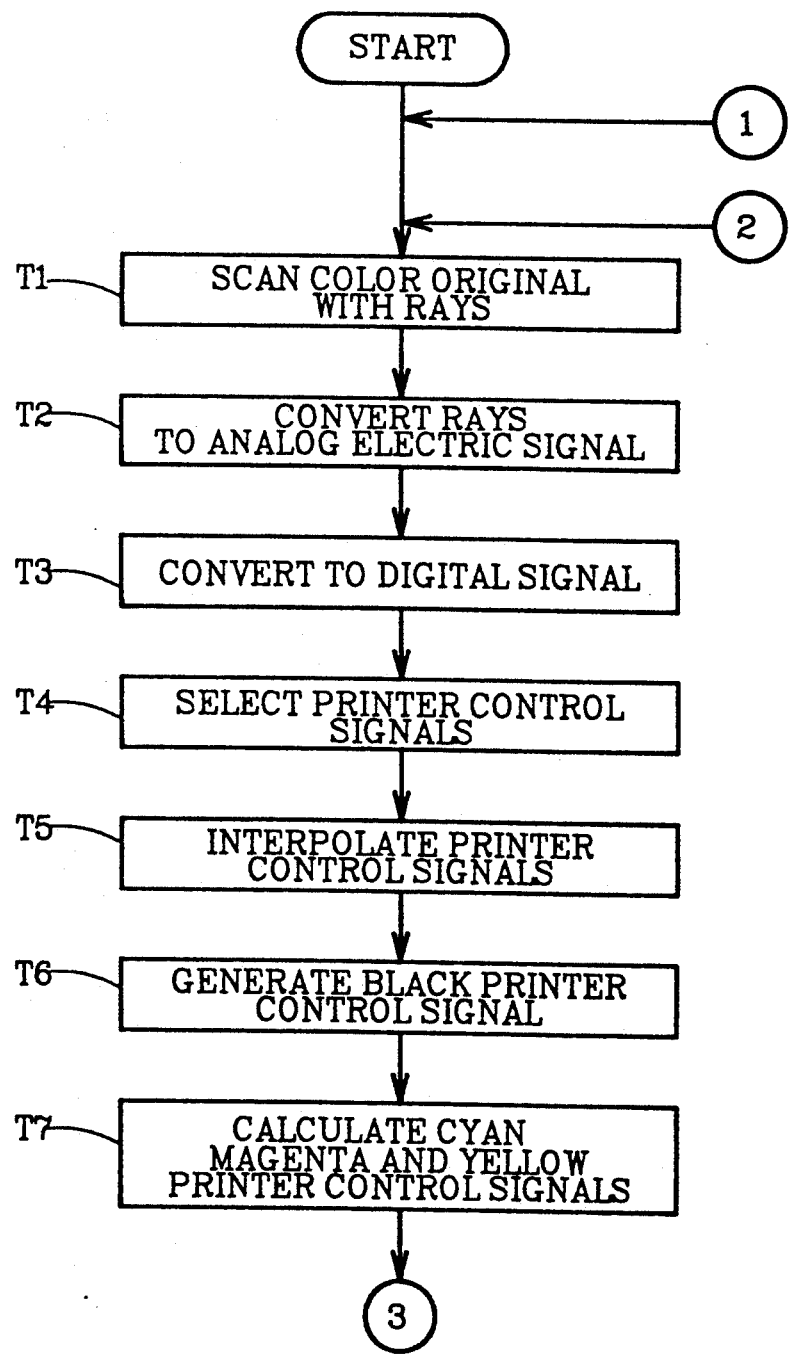
FIGS. 5A and 5B are flowcharts indicating the operation of the copying machine for the embodiment.
Figure 5B:
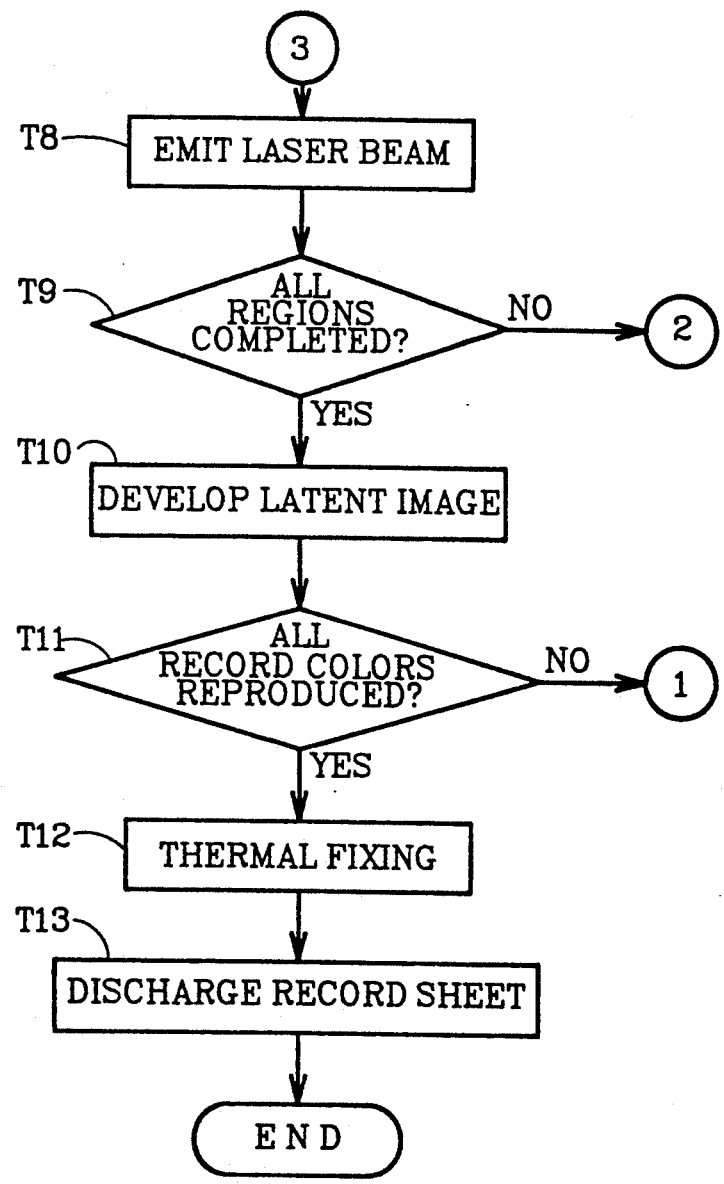

The operation of the digital color copying machine 1 is now described with reference to the flowcharts in FIGS. 5A and 5B. The color original placed on the original feeder 14 is supplied through the feed rollers 16 onto the transparent base 5. The color original can be directly placed down on the transparent base 5 with the cover 6 open, and the cover 6 is then closed. At step T1, the surface of the color original is scanned with white light rays emitted from the fluorescent lamps 7 being moved in the auxiliary scanning direction by the light-source moving device 9. The surface of the color original reflects the light rays, and the movable and fixed reflecting mirrors 8 and 10 also reflect the light rays. At step T2, the light rays thus reflected pass through the lens 11 and the filter 12 to the CCD 13, which converts the light rays into the analog electric signals. The filter 12 comprises the red, green and blue elements that enable passage of only the red, green, and blue light components, respectively. The red, green and blue elements filter each light component in turn while the light-source moving device 9 moves the fluorescent lamps 7 and one line of the color original is scanned. The CCD 13 transmits the color original data composed of the analog electric signals to the A/D transducer 18. Subsequently, at step T3, the A/D transducer 18 converts the analog electric signals into the digital electric signals, and the image storage 19 stores the digital electric signals. At step T4, according to the digital electric signals indicative of the colors present in the color original, the cyan, magenta or yellow printer control signals are selected from the ROM 20. Subsequently, at step T5, the printer control signals selected at step T4 are interpolated as shown in the equation (1), and the cyan, magenta and yellow printer control signals for recording or reproducing the color original data are determined.

When the cyan, magenta and yellow printer control signals determined as aforementioned have the concentration having or exceeding the specified value, at step T6, a black printer control signal is sent out. For example, when the average value of the cyan, magenta and yellow printer control signals determined at step T5 is larger than half of the maximum value of these printer control signals, the black printer control signal is generated. The value of the black printer control signal is twice as large as the difference between the above average value and half of the above maximum value. After the black printer control signal is generated at step T6, the cyan, magenta and yellow printer control signals are calculated at step T7. Specifically, the value of the black printer control signal is subtracted from the value of the cyan, magenta and yellow printer control signals in the direction in which the concentration of the chromatic image decreases, as shown in the following equations:

$$K = \{((C + M + Y)/3) - T\}2 \quad (\geq 0) \quad (2)$$
$$C = C - (K/2) \quad (\geq 0) \quad (3)$$
$$M = M - (K/2) \quad (\geq 0) \quad (4)$$

-continued
$$Y = Y - (K/2) \quad (\geq 0) \quad (5)$$

In the equations, T denotes half of the maximum value of the interpolated printer control signals. When the input printer control signals are from 8 bit storage, T equals 128. C, M, Y and K denote cyan, magenta, yellow and black printer control signals, respectively.

After the aforementioned color corrective process, the cyan, magenta and yellow printer control signals are sent to the laser control 24. Under the control of the laser control 24, at step T8 the laser 23 emits a laser beam to the polygonal mirror 25. The photosensitive drum 27 uniformly charged by the electrostatic charge unit 28 is exposed to the laser beam reflected by the polygonal mirror 25. An electrostatic latent image is formed on the photosensitive drum 27.

It is determined at step T9 whether all the regions of the original chromatic image are completed. When the determination at step T9 is negative, the process goes back to step T1. When it is determined at step T9 that all the regions of the original chromatic image are completed, the process goes to step T10 for developing the chromatic image.

Specifically, at step T10, according to the printer control signals corresponding to the decomposed red, green and blue light components, the cyan, magenta, yellow and black developing units 29, 30, 31 and 41 attach toner to the latent image formed on the photosensitive drum 27, thereby developing the latent image.

Subsequently, it is determined at step T11 whether all the record colors of the original chromatic image are reproduced. When the determination at step T11 is negative, the process goes back to step T1. When the determination at step T11 is affirmative, the process goes to step T12 for thermal fixing.

Specifically, at step T12, the record sheet is supplied from the paper cassette 36 and is wound through a transfer drum 37. The developed latent image is transferred from the photosensitive drum 27 onto the record sheet. The cleaner 35 removes residual toner from the photosensitive drum 27. The transferred record sheet is thermally fixed by the thermal fixing unit 38 provided almost at the middle of the paper feed unit 40. Subsequently, at step T13 the thermally fixed record sheet is discharged onto the paper tray 39. The process steps for operating the digital color copying machine 1 end.

The method for determining the cyan, magenta and yellow printer control signals to be stored in the ROM 20 is now outlined.

A simulator of the copying machine according to this invention is first prepared as follows. The sample data combining cyan, magenta, yellow and black printer control signals ($6^4 = 1296$), each of which signals has six equally divided ranges, is prepared. The printer control signals of each patch of a rectangular region composed of the sample data are sent to a recording portion. The recording portion outputs and records the patch. By measuring the patch with a spectro-colorimeter, three stimulus values of the CIE1931 standard color specification of the image recorded according to the printer control signals are obtained. The simulator serves to obtain the three stimulus values of the image recorded according to any combination of the printer control signals.

Before the simulator, a portion is provided for calculating, from the cyan, magenta and yellow printer control signals, a black printer control signal as well as new cyan, magenta and yellow printer control signals, by using the equations (2) through (5). After the simulator, a portion is added for converting the values of the CIE1931 standard color specification to the values of the CIE1976(L*a*b*) color specification. In the aforementioned structure, when the cyan, magenta and yellow printer control signals are entered, the simulator sends out the values of the CIE1976(L*a*b*) color specification of the image recorded using four colors.

First, the space of the printer control signals is divided by the printer control signals of the sample data into 1296 blocks. It is then determined to which block an input printer control signal combination (C,M,Y,K) belongs. The three stimulus values Dj of the CIE1931 color specification of the image recorded according to the input printer control signal combination are obtained in the following equations. Specifically, the three stimulus values corresponding to the printer control signal combination of each vertex of the blocks are multiplied with the volume Ai of the four-dimensional space including the diagonal vertices of each vertex of the blocks as well as the printer control signal combination of the vertices.

On the assumption that i equals 0, 1, 2, 3, 4, 5, 6, 7, 8, 9, 10, 11, 12, 13, 14 and 15, when i equals 0, 2, 4, 6, 8, 10, 12, 14:

$$B1 = MOD(C,H)$$
When $i$ equals 1, 3, 5, 7, 9, 11, 13, 15:
$$B1 = H - MOD(C,H)$$
When $i$ equals 0, 1, 4, 5, 8, 9, 12, 13:
$$B2 = MOD(M,H)$$
When $i$ equals 2, 3, 6, 7, 10, 11, 14, 15:
$$B2 = H - MOD(M,H)$$
When $i$ equals 0, 1, 2, 3, 8, 9, 10, 11:
$$B3 = MOD(Y,H)$$
When $i$ equals 4, 5, 6, 7, 12, 13, 14, 15:
$$B3 = H - MOD(Y,H)$$
When $i$ equals 0, 1, 2, 3, 4, 5, 6, 7:
$$B4 = MOD(K,H)$$
When $i$ equals 8, 9, 10, 11, 12, 13, 14, 15:
$$B4 = H - MOD(K,H)$$
$$Ai = B1 \cdot B2 \cdot B3 \cdot B4$$

$$Dj = \left( \sum_{i=0}^{15} (Ai \cdot Lij) \right) / \sum_{j=0}^{15} Ai \qquad (6)$$

In the equations, MOD(C,H), for example, is a remainder obtained by dividing C by H. Lij denotes three stimulus values of the CIE1931 standard color specification at the vertex i. Dj denotes the three stimulus values of CIE1931 standard color specification of the input printer control signal combination (C,M,Y). H denotes the level length of one block.

Subsequently, the cyan, magenta and yellow color signals ($18^3 = 5832$) of the input printer control signal combination have eighteen equally divided blocks having vertices. Each of the vertices bears input color data signals. Printer control signals CC are obtained and stored, such that the color closest to each vertex color (R,G,B) can be reproduced.

Figure 4A:
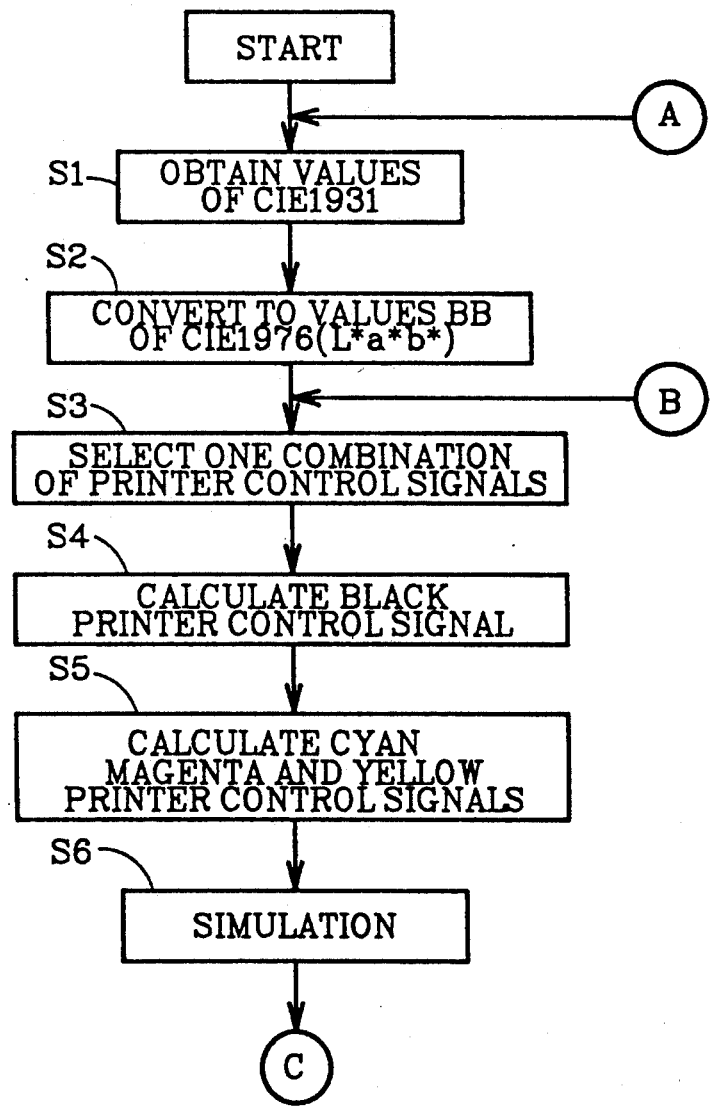
FIGS. 4A and 4B are flowcharts indicating the method for obtaining printer control signals stored in ROM 20.
Figure 4B:
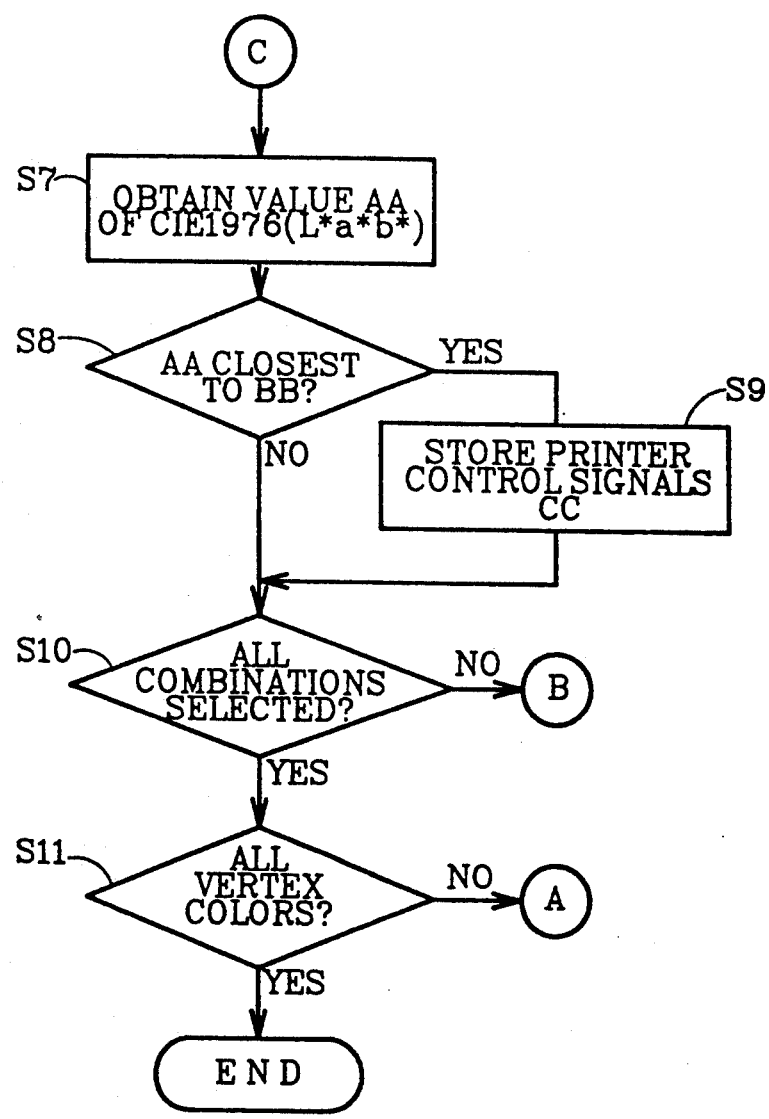

Specifically, the method for determining the cyan, magenta and yellow printer control signals to be stored in he ROM 20 is explained with reference to the flowcharts in FIG. 4A and 4B. At step S1 the vertex color (R,G,B) is converted to three stimulus values (X,Y,Z) of the CIE1931 standard color specification. When Luther condition, which is disclosed in "Principle of Color Reproduction" authored by J.A.C. Yule, is satisfied at the original reading portion 2, the vertex color (R,G,B) can be linearly converted into the three stimulus values (X,Y,Z). Subsequently, at step S2 the three stimulus values (X,Y,Z) are converted into the values BB of the CIE1976(L*a*b*).

At step S3, one combination of cyan, magenta and yellow printer control signals are selected. At step S4 the black printer control signal is calculated from the selected combination of the cyan, magenta and yellow printer control signals using the equations (2). At step S5, cyan, magenta and yellow printer control signals are calculated using the black control signal calculated at step S4 and the selected combination, using the equations (3), (4) and (5), respectively. At step S6, simulation is carried out, by operating the simulator prepared as aforementioned. Subsequently, at step S7, the converted values AA of CIE1976(L*a*b*) color specification are obtained. It is determined at step S8 whether the values AA are closest to the values BB. When step S8 determines that the values AA are closest to the values BB, at step S9 the values AA are stored as the printer control signals CC. When the determination at step S8 is negative, the process goes to step S10. The printer control signals CC have the smallest color difference from the vertex color of the input color data.

At step S8, the values AA closest to the values BB are obtained by checking the color difference between two colors $(L^*_1, a^*_1, b^*_1)$ and $(L^*_2, a^*_2, b^*_2)$ as follows:

$$E = \{(L^*_1 - L^*_2)^2 + (a^*_1 - a^*_2)^2 + (b^*_1 - b^*_2)^2\}^{\frac{1}{2}}$$

It is determined at step S10 whether all the combinations of the cyan, magenta and yellow printer control signals have been selected. When all the combinations have not been selected at step S10, the process step goes back to step S3. When all the combinations have been selected at step S10, the process step goes to step S11. It is determined at step S11 whether the printer control signals for all the vertex colors have been obtained. If no, the process step goes back to step S1. If yes, the process step ends.

The interpolation using the equation (1) is explained below using FIG. 3.

Mj in the equation (1) is obtained as follows, on the assumption that j=0, 1, 2, 3, 4, 5, 6, 7. When j equals 0, 2, 4, 6:

$$B1 = MOD(C,H)$$
When $j$ equals 1, 3, 5, 7:
$$B1 = H - MOD(C,H)$$
When $j$ equals 0, 1, 4, 5:
$$B2 = MOD(M,H)$$
When $j$ equals 2, 3, 6, 7:
$$B2 = H - MOD(M,H)$$
When $j$ equals 0, 1, 2, 3:
$$B3 = MOD(Y,H)$$
When $j$ equals 4, 5, 6, 7:
$$B3 = H - MOD(Y,H)$$
When $i$ equals 0, 1, 2, 3, 4, 5, 6, 7,
$$Mj = B1 \cdot B2 \cdot B3$$

$$Dj = \left( \sum_{j=0}^{7} (Mj \cdot Lij) \right) / \sum_{j=0}^{7} Mj \qquad (1)$$

In the equations, MOD(C,H), for example, is a remainder obtained by dividing C by H. Lij denotes a printer control signal of the vertex surrounding original data color in a quantized block. According to input original data, the printer control signal Lij is selected from the ROM 20. H denotes the level length of one block.

Figure 3:
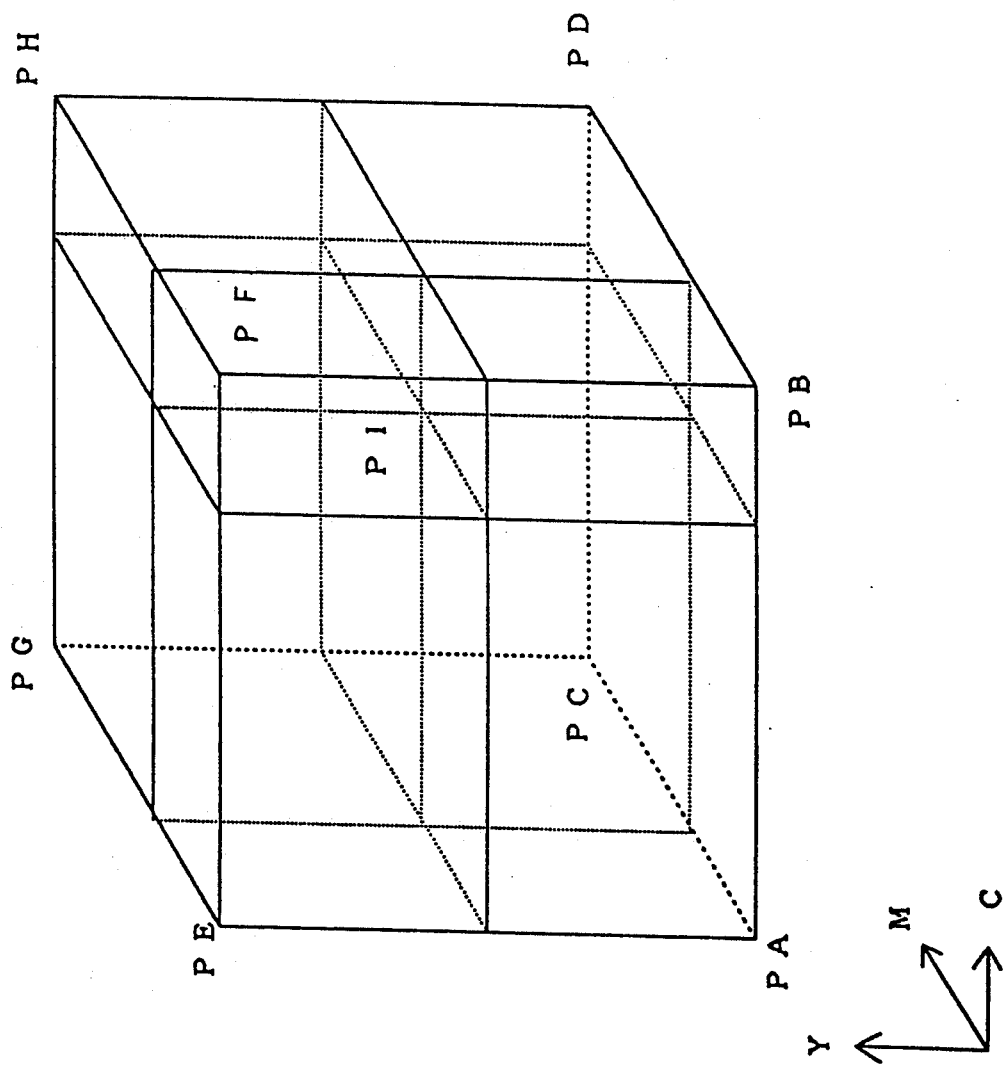
FIG. 3 is a conceptual view indicating the method for interpolating printer control signals.

As shown in FIG. 3, for example, PI is an original data (22,36,52). PA, PB, PC, PD, PE, PF, PG and PH are vertex colors (233,221,207), (219,222,207), (234,205,209), (220,206,210), (233,223,190), (220,224,190), (235,206,191) and (221,207,192), respectively. The following equations are then obtained:

$$C = \{(8 \times 9 \times 8 \times 233) + (7 \times 9 \times 8 \times 219) +$$
$$(8 \times 6 \times 8 \times 234) + (7 \times 6 \times 8 \times 220) +$$
$$(8 \times 9 \times 7 \times 233) + (7 \times 9 \times 7 \times 220) +$$
$$(8 \times 6 \times 7 \times 235) + (7 \times 6 \times 7 \times 221)\}/(15 \times 15 \times 15)$$
$$= (134208 + 110376 + 89856 + 73920 + 117432 + 97020 +$$
$$78960 + 64974)/3375$$
$$\text{nearly equals } 227$$
$$M = \{(8 \times 9 \times 8 \times 221) + (7 \times 9 \times 8 \times 222) +$$
$$(8 \times 6 \times 8 \times 205) + (7 \times 6 \times 8 \times 206) +$$
$$(8 \times 9 \times 7 \times 223) + (7 \times 9 \times 7 \times 224) +$$
$$(8 \times 6 \times 7 \times 206) + (7 \times 6 \times 7 \times 207)\}/(15 \times 15 \times 15)$$
$$= (127296 + 111888 + 86016 + 69214 + 112392 + 98784 +$$
$$69216 + 60858)/3375$$
$$\text{nearly equals } 216$$
$$Y = \{(8 \times 9 \times 8 \times 207) + (7 \times 9 \times 8 \times 207) +$$
$$(8 \times 6 \times 8 \times 209) + (7 \times 6 \times 8 \times 210) +$$
$$(8 \times 9 \times 7 \times 190) + (7 \times 9 \times 7 \times 120) +$$
$$(8 \times 6 \times 7 \times 191) + (7 \times 6 \times 7 \times 192)\}/(15 \times 15 \times 15)$$
$$= (119232 + 104328 + 80256 + 70560 + 95760 + 83790 +$$
$$64176 + 56448)/3375$$
$$\text{nearly equals } 200$$

Cyan, magenta and yellow printer control signals corresponding to the original data color are calculated as shown above. From the calculated cyan, magenta and yellow printer control signals, black, cyan, magenta and yellow control signals are obtained using equations (2) through (5) as follows:

$$K = \{[(227 + 216 + 200)/3] - 128\} \times 2 \text{ nearly equals } 173$$
$$C = 227 - (173/2) = 141$$
$$M = 216 - (173/2) = 130$$
$$Y = 200 - (173/2) = 114$$

The above calculated black (K), cyan (C), magenta (M) and yellow (Y) printer control signals are for a chromatic image record.

This invention has been described above with reference to the preferred embodiment as shown in the drawings. Modifications and alterations may become apparent to one skilled in the art upon reading and understanding the specification. Despite the use of the embodiment for illustrative purposes, however, it is intended to include all such modifications and alterations within the scope and spirit of the appended claims.

In this spirit, it should also be noted that in the embodiments as shown and described, the digital color copying machine 1 is used. The invention, however, could be applied to a color printer provided with no color original reading portion.

What is claimed is:

1. An image processing device for use in a chromatic image recording apparatus, comprising:
    signal receiving means for receiving color data obtained from an original; and
    generating means for processing the original color data to generate printer control signals having values corresponding to print concentration levels, said generating means determining whether a first predetermined number of printer control signals can accurately provide characterization of the original color data, said generating means generating printer control signals of a second predetermined number greater than said first predetermined number when said generating means determines that the first predetermined number of printer control signals cannot accurately provide characterization of the original color data, in which
    said generating means includes storage means, selecting means and interpolating means, said storage means storing plural sets of predetermined printer control signals associated with various color data relating to an original, said selecting means selecting a desired set of predetermined printer control signals from said storage means in accordance with each of said various original color data, said interpolating means interpolating the predetermined printer control signals selected by said selecting means to obtain new printer control signals of the first number, said new printer control signals having a print concentration level to provide accurate characterization of each original color data.

2. The image processing device according to claim 1, wherein said signal receiving means receives a concentration signal corresponding to one of concentration and reflectance of an area of the original.

3. The image processing device according to claim 2, wherein said generating means generates the second number of printer control signals when the new printer control signals provided by said interpolating means have a print concentration level which is equal to or higher than a predetermined level.

4. The image processing device according to claim 3, wherein said new printer control signals having a print concentration level lower than said predetermined level are cyan, magenta and yellow printer control signals.

5. The image processing device according to claim 3, wherein said new printer control signals having a print concentration level equal to or higher than said predetermined level are cyan, magenta, yellow and black printer control signals.

6. The image processing device according to claim 5, wherein said generating means includes black printer control signal determining means for determining the black printer control signal according to the cyan, magenta and yellow printer control signals, and adjustment means for adjusting each of the cyan, magenta and yellow printer control signals by an amount determined based on the black printer control signal after the black printer control signal has been determined by the black printer control signal determining means.

7. A chromatic image recording apparatus, comprising:
    scanning means for scanning an original to provide color data obtained from the original;
    signal receiving means for receiving said color data;
    generating means for processing the original color data to generate printer control signals having values corresponding to print concentration levels, said generating means determining whether a first predetermined number of printer control signals can accurately provide characterization of the original color data, said generating means generating printer control signals of a second predetermined number greater than said first predetermined number when said generating means determines that the first predetermined number of printer control signals cannot accurately provide characterization of the original color data; and
    image recording means for recording an image of the original in accordance with said generated printer control signals, in which said generating means includes storage means, selecting means and interpolating means, said storage means storing plural sets of predetermined printer control signals associated with various color data relating to an original, said selecting means selecting a desired set of predetermined printer control signals from said storage means in accordance with each of said various original color data, said interpolating means interpolating the predetermined printer control signals selected by said selecting means to obtain new printer control signals of the first number, said new printer control signals having a print concentration level to provide accurate characterization of each original color data.

8. The image recording apparatus according to claim 7, wherein said signal receiving means receives a concentration signal corresponding to one of concentration and reflectance of an area of the original.

9. The image recording apparatus device according to claim 8, wherein said generating means generates the second number of printer control signals when the new printer control signals provided by said interpolating means have a print concentration level which is equal to or higher than a predetermined level.

10. The image recording apparatus according to claim 9, wherein said new printer control signals having a print concentration level lower than said predetermined level are cyan, magenta and yellow printer control signals.

11. The image recording apparatus according to claim 9, wherein said new printer control signals having a print concentration level equal to or higher than said predetermined level are cyan, magenta, yellow and black printer control signals.

12. The image recording apparatus according to claim 11, wherein said generating means includes black printer control signal determining means for determining the black printer control signal according to the cyan, magenta and yellow printer control signals, and adjustment means for adjusting each of the cyan, magenta and yellow printer control signals by an amount determined based on the black printer control signal after the black printer control signal has been determined by the black printer control signal determining means.

* * * * *